US010786118B2

(12) United States Patent
Zeng et al.

(10) Patent No.: US 10,786,118 B2
(45) Date of Patent: Sep. 29, 2020

(54) FOOD PROCESSOR

(71) Applicants: GUANGDONG MIDEA CONSUMER ELECTRICS MANUFACTURING CO., LTD., Foshan (CN); MIDEA GROUP CO., LTD., Foshan (CN)

(72) Inventors: Xianghe Zeng, Foshan (CN); Jianfei Xu, Foshan (CN); Weijie Chen, Foshan (CN); Yan She, Foshan (CN); Yan Tang, Foshan (CN)

(73) Assignees: GUANGDONG MIDEA CONSUMER ELECTRIC MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 16/274,084

(22) Filed: Feb. 12, 2019

(65) Prior Publication Data

US 2019/0174959 A1   Jun. 13, 2019

Related U.S. Application Data

(63) Continuation of application No. PCT/CN2017/096185, filed on Aug. 7, 2017.

(30) Foreign Application Priority Data

Aug. 12, 2016  (CN) .......................... 2016 1 0666206
Aug. 12, 2016  (CN) ..................... 2016 2 0877420 U

(51) Int. Cl.
*A47J 43/00*  (2006.01)
*A47J 43/046*  (2006.01)
(Continued)

(52) U.S. Cl.
CPC ......... *A47J 43/046* (2013.01); *A47J 43/0761* (2013.01); *A47J 27/62* (2013.01); *A47J 43/075* (2013.01)

(58) Field of Classification Search
CPC ........ A47J 27/62; A47J 43/075; A47J 43/046; A47J 43/0761
See application file for complete search history.

(56) References Cited

U.S. PATENT DOCUMENTS 6,371,013 B1    4/2002  Chen
2012/0205475 A1*  8/2012  Wu ....................... A47J 43/046
                                                                   241/101.3
(Continued)

FOREIGN PATENT DOCUMENTS

CN    101991373 A    3/2011
CN    202665329 U    1/2013
(Continued)

OTHER PUBLICATIONS

Guangdong Midea Consumer Electrics Manufacturing Co. Ltd., International Search Report and Written Opinion, PCT/CN2017/096185, dated Nov. 10, 2017, 19 pgs.

(Continued)

*Primary Examiner* — Anshu Bhatia
(74) *Attorney, Agent, or Firm* — Morgan, Lewis & Bockius LLP

(57) ABSTRACT

The present disclosure provides a food processor which includes a main engine, a stirring cup, and a cup cover assembly. A main control board is defined in the main engine and the stirring cup is mounted on the main engine. The cup cover assembly covers the stirring cup and the bottom of the stirring cup defines a heating device which electrically is connected to the main control board. The cup cover assembly includes an upper cover and an inner surface of the upper cover defines an anti-overflow detecting element, and the anti-overflow detecting element electrically is connected to the main control board. When a part of foam contacts the anti-overflow detecting element, the main control board (Continued)

controls the heating device to stop heating and no foam is generated, therefore preventing the foam liquid from overflowing the stirring cup.

18 Claims, 8 Drawing Sheets

(51) Int. Cl.
*A47J 43/07* (2006.01)
*A47J 27/62* (2006.01)

(56) References Cited

U.S. PATENT DOCUMENTS

2015/0117139 A1* 4/2015 Conti ................. B01F 7/00291
366/146
2015/0264954 A1 9/2015 Yu et al.

FOREIGN PATENT DOCUMENTS

| CN | 103932609 A | 7/2014 |
| CN | 204410544 U | 6/2015 |
| CN | 204618000 U | 9/2015 |
| CN | 204950670 U | 1/2016 |
| CN | 206284948 U | 6/2017 |
| WO | WO2014/049528 A1 | 4/2014 |

OTHER PUBLICATIONS

Notification of Reason for Refusal, KR1020197003998, dated Apr. 28, 2020, 10 pgs.

* cited by examiner

FOOD PROCESSOR

CROSS-REFERENCE TO RELATED APPLICATIONS

This patent application is a continuation application of PCT Patent Application No. PCT/CN2017/096185, entitled "FOOD PROCESSOR" filed on Aug. 7, 2017, which claims priority to (i) Chinese Patent Application No. 201610666206.7, entitled "FOOD PROCESSOR" filed with Chinese Patent Office on Aug. 12, 2016, and (ii) Chinese Patent Application No. 201620877420.2, entitled "FOOD PROCESSOR" filed with Chinese Patent Office on Aug. 12, 2016, all of which are incorporated herein by reference in their entirety.

TECHNICAL FIELD

The disclosure generally relates to the technical field of food processing, and more particularly relates to a food processor.

BACKGROUND

Food processor includes soybean milk maker, wall-breaking cooking machine, blender, and the like, which are the machines using motor to drive smashing and squeezing food. Taking the wall-breaking cooking machine as an example, the motor can speed up to more than 25000 revolutions per minute (rpm) to instantly break the cell walls of fruits and vegetables. Therefore, the wall-breaking cooking machine can effectively extract phytochemicals, and the wall-breaking cooking machine has been regarded as the preferred household electrical appliance for modern home health care and health preservation. The latest generation of food processor has much more functions integrating heater and blender, which can not only make vegetable and fruit juice and ice blended powder, but also heat to make soybean milk, fish soup, soup with Chinese medicinal material, porridge, etc.

However, the latest generation of wall-breaking cooking machine is prone to generate foam when blending and heating food, and the foam is prone to overflow from the cup rabbet of the cup, thus greatly affecting the performance of the food processor.

SUMMARY

It is therefore one main object of the present disclosure to provide a food processor, which aims to prevent the foam from overflowing the cup by defining an anti-overflow metal inner cover for monitoring the foam generated during heating.

In order to achieve the aim, the food processor provided by the present disclosure includes a main engine, a stirring cup, and a cup cover assembly, a main control board is defined in the main engine;

the stirring cup is mounted on the main engine, and the cup cover assembly covers the stirring cup;

the bottom of the stirring cup defines a heating device, the heating device electrically is connected to the main control board; and the cup cover assembly includes an upper cover, an inner surface of the upper cover defines an anti-overflow detecting element, and the anti-overflow detecting element electrically is connected to the main control board.

In an embodiment, the heating device includes a heat conducting plate and a heating assembly, the heat conducting plate is defined at the bottom of the stirring cup, the heating assembly is defined below the heat conducting plate, and the heating assembly electrically is connected to the main control board; the heating assembly is a resistance heating assembly, the resistance heating assembly is defined at a lower surface of the heat conducting plate; or, the heating assembly is an electromagnetic heating assembly, the heat conducting plate is a magnetic conducting plate, and the electromagnetic heating assembly faces the magnetic conducting plate.

In an embodiment, the upper cover defines a feed inlet, and a feed cover is mounted at the feed inlet; and a sealing retaining ring is defined between a portion of the upper cover extending into the stirring cup and a wall of the stirring cup to seal a cup rabbet of the stirring cup.

In an embodiment, the anti-overflow detecting element is an anti-overflow metal inner cover, and the anti-overflow metal inner cover includes a metal ring extending towards the inside of the stirring cup.

In an embodiment, the metal ring extends downwards at a distance H in a range of 0.5 millimeters to 70 millimeters.

In an embodiment, the anti-overflow metal inner cover includes an annular cover plate, the metal ring extends from an outer periphery of the cover plate to the inside of the stirring cup, and the anti-overflow metal inner cover is positioned in the upper cover.

In an embodiment, the cover plate defines a plurality of screw holes, the upper cover correspondingly defines screw posts, and the cover plate is fixedly connected to the upper cover by screw bolts passing through the screw holes and the screw posts.

In an embodiment, an upper side of the cover plate defines a first sealing ring, the first sealing ring is adjacent to an inner periphery of the cover plate, a lower side of the metal ring defines a flanging, and a second sealing ring is defined between the flanging and the upper cover.

In an embodiment, the upper cover is a plastic element, the anti-overflow metal inner cover and the upper cover are in an integrated structure, and the upper cover and the anti-overflow metal inner cover are connected by a secondary injection molding.

In an embodiment, the anti-overflow detecting element is an anti-overflow metal detecting piece, and the anti-overflow metal detecting piece attaches to the inner surface of the upper cover, and extends towards the inside of the stirring cup.

In an embodiment, the upper cover is a plastic element, the anti-overflow metal detecting piece and the upper cover are in an integrated structure, and the upper cover and the anti-overflow metal strip are connected by a secondary injection molding.

In an embodiment, the upper cover includes a main body covering a cup rabbet of the stirring cup, and a mounting part radially protruding from a side of the main body, an electric conductor is defined in the mounting part, one end of the electric conductor is connected to the anti-overflow detecting element, and the other end of the electric conductor electrically is connected to the main control board.

In an embodiment, the end of the electric conductor away from the anti-overflow detecting element defines a conducting rod; and the stirring cup defines a handle, an upper end of the handle defines an avoiding hole, a conducting needle is defined in the avoiding hole, one end of the conducting needle electrically is connected to the main control board, the other end of the conducting needle exposes from the avoiding hole and abuts against the conducting rod.

In an embodiment, the mounting part defines a sliding groove, the electric conductor is installed in the sliding groove, an end of the electric conductor passes through the sliding groove to abut against the anti-overflow detecting element, and a first spring is defined in the sliding groove, the first spring sleeves around the end of the electric conductor away from the anti-overflow detecting element, and when the first spring is in a compressed state, the electric conductor abuts against the anti-overflow detecting element.

In an embodiment, the anti-overflow detecting element, the electric conductor, and the conducting rod are in an integrated structure.

In an embodiment, the end of the electric conductor away from the anti-overflow detecting element defines a first induction element; and the upper end of the handle defines a second induction element, the second induction element is coupled with the first induction element, and the second induction element electrically is connected to the main control board.

In an embodiment, the anti-overflow detecting element, the electrical conductor, and the first induction element are in an integrated structure.

In an embodiment, the stirring cup is made of glass, stainless steel, or plastic.

According to the technical solution of the present disclosure, the anti-overflow detecting element is defined at the inner surface of the upper cover, so that when a part of foam contacts the anti-overflow detecting element, the main control board controls the heating device to stop heating, then no foam is generated, for preventing the foam liquid from overflowing the stirring cup. When the foam disappear, the anti-overflow detecting element feeds the signal back to the main control board, and the main control board controls the heating device to heat again, thus repeatedly working until the food is heated to be braised.

As the heated food is generally sticky, the foam is prone to stick to the side wall of the stirring cup, and if the anti-overflow detecting device is arranged at the side wall of the stirring cup, which may cause the generated anti-overflow signal to be inaccurate, thus further causing the main control board to control the heating device to stop heating for a long time. While the anti-overflow detecting element is defined at the inner surface of the upper cover, which can improve the accuracy of signal generated by the anti-overflow detecting element. And, as the anti-overflow detecting element is arranged at the inner surface of the upper cover, it does not need to modify the structure of the stirring cup of the existing food processor, which is convenient to the design and process.

BRIEF DESCRIPTION OF THE DRAWINGS

To better illustrate the technical solutions that are reflected in various embodiments according to this disclosure or that are found in the prior art, the accompanying drawings intended for the description of the embodiments herein or for the prior art will now be briefly described, it is evident that the accompanying drawings listed in the following description show merely some embodiments according to this disclosure, and that those having ordinary skill in the art will be able to obtain other drawings based on the arrangements shown in these drawings without making inventive efforts.

LABELS ILLUSTRATION FOR DRAWINGS

Figure 1:
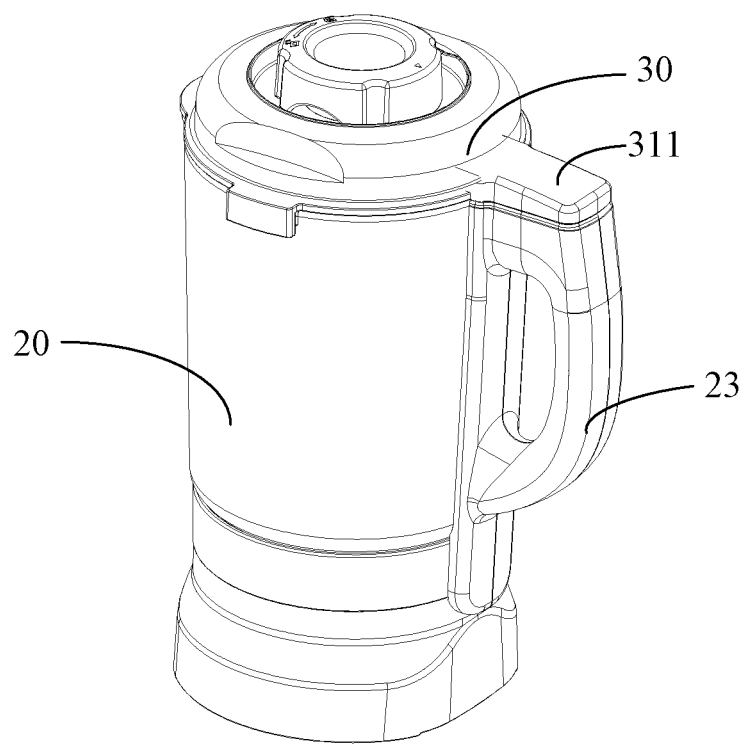
FIG. 1 is a structural diagram of the food processor of the present disclosure according to an embodiment.
Figure 1:
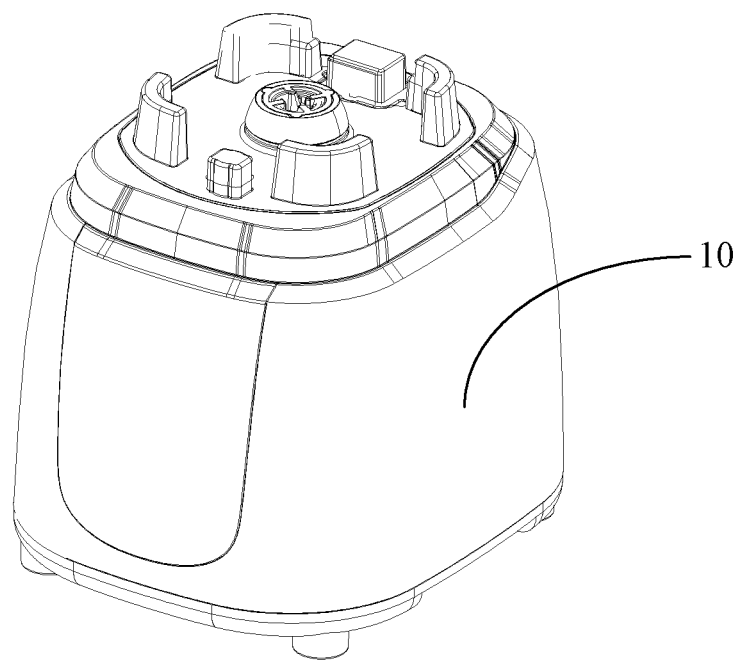

| Label | Name | Label | Name |
|---|---|---|---|
| 100 | food processor | 313 | sliding groove |
| 10 | main engine | 313a | first side wall |
| 11 | motor | 313b | second side wall |
| 20 | stirring cup | 40 | stirring knife assembly |
| 21 | metal plate | 41 | blade |
| 22 | heating assembly | 42 | cutter shaft |
| 23 | handle | 501 | anti-overflow metal inner cover |
| 231 | support | 50a | cover plate |
| 232 | sliding hole | 50b | metal ring |
| 24 | mounting box | 50c | screw hole |
| 241 | mounting hole | 50d | flanging |
| 242 | buckle | 51 | electric conductor |
| 30 | cup cover assembly | 511 | limiting part |
| 31 | upper cover | 512 | first spring |
| 31c | screw post | 52 | conducting rod |
| 311 | main body | 60 | conducting needle |
| 312 | mounting part | 61 | second spring |
| 312a | upper cover | 62 | abutting part |
| 312b | lower cover | 71 | first sealing ring |
| 20a | water outlet | 72 | second sealing ring |
| 50 | anti-overflow detecting element | 502 | anti-overflow metal detecting piece |
| 81 | first induction element | 82 | second induction element |

The realization of the aim, functional characteristics, advantages of the present disclosure are further described specifically with reference to the accompanying drawings and embodiments.

DETAILED DESCRIPTION

In the following, the technical solution in the embodiment of the application will be described clearly and completely with reference to the drawings in the embodiment of the application. Obviously, the described embodiment is only a part of the embodiment of the application, not all of the embodiments. Based on the embodiments in this application, all other embodiments obtained by ordinary technicians in this field without creative labor are within the scope of protection in this application.

It is to be understood that, all of the directional instructions in the exemplary embodiments of the present disclosure (such as top, down, left, right, front, back . . . ) can only be used for explaining relative position relations, moving condition of the elements under a special form (referring to figures), and so on, if the special form changes, the directional instructions changes accordingly.

In addition, the descriptions, such as the "first", the "second", and the like, in the present disclosure, can only be used for describing the aim of description, and cannot be understood as indicating or suggesting relative importance or impliedly indicating the number of the indicated technical character. Therefore, the character indicated by the "first", the "second" can express or impliedly include at least one character. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not existed, and is not contained in the protection scope required by the present disclosure.

The present disclosure provides a food processor 100 which includes a wall-breaking cooking machine, a blender, a juicer, and a soybean milk machine. And, the wall-breaking cooking machine can integrate the functions of the juicer, the soybean milk machine, the ice cream machine, the cooking machine, the grinding machine, and the like, the wall-breaking cooking machine can instantly break the cell walls of food and release phytochemicals.

Figure 2:
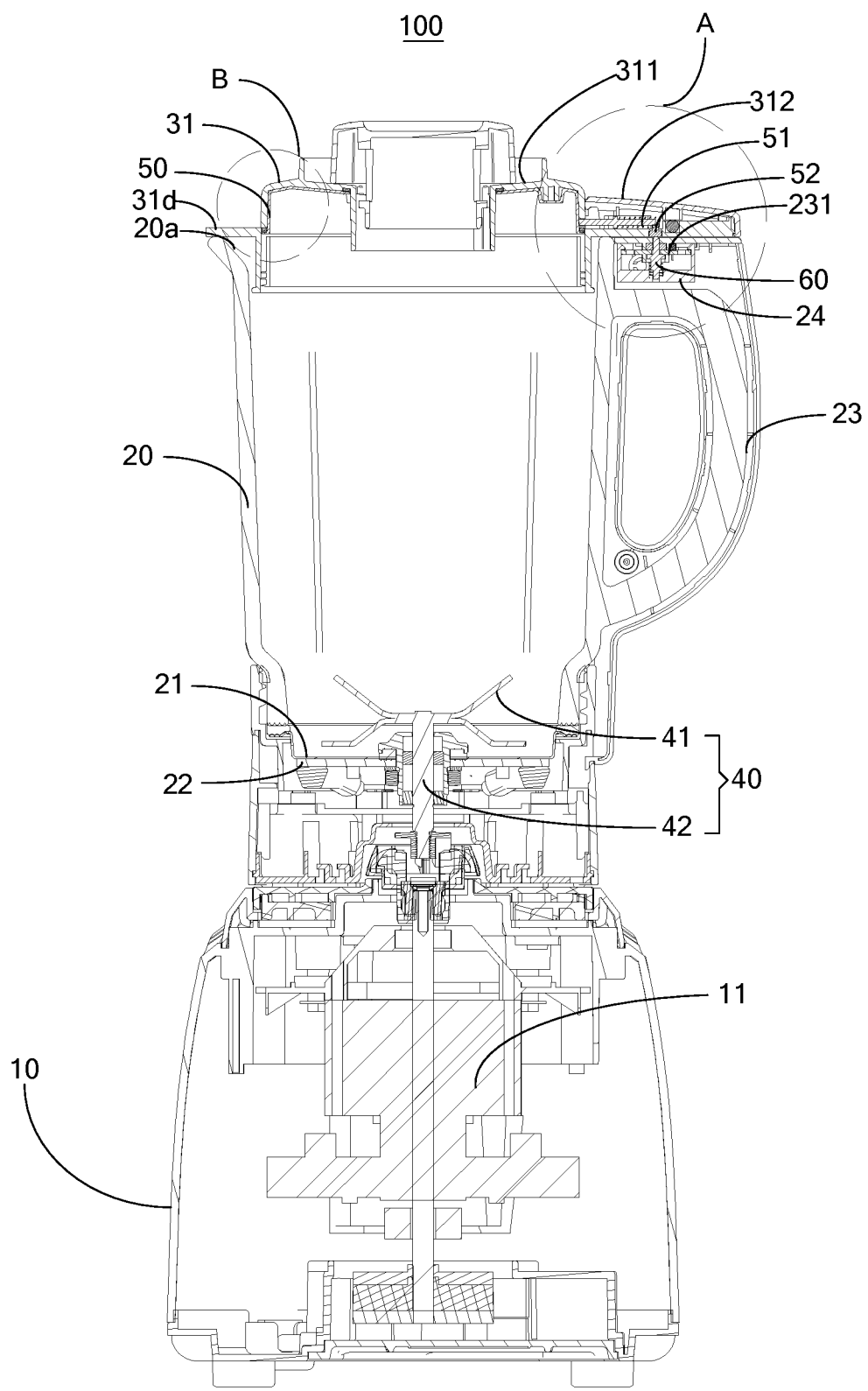
FIG. 2 is a cross-sectional diagram of the food processor of the present disclosure according to an embodiment.

In the embodiment of the present disclosure, referring to FIGS. 1 and 2, the food processor 100 includes a main engine 10, a heating device, a stirring cup 20, and a cup cover assembly 30, a main control board (not labelled) and a motor 11 are defined in the main engine 10.

The stirring cup 20 is mounted on the main engine 10, the cup cover assembly 30 covers the stirring cup 20, and the stirring cup 20 is also provided with a stirring knife assembly 40, the stirring knife assembly 40 includes blades 41 and a cutter shaft 42, the blades 41 are defined in the stirring cup 20, and the cutter shaft 42 is connected to the motor 11.

The heating device is configured to heat the stirring cup 20 and electrically is connected to the main control board. Generally, the heating device is arranged at the bottom of the stirring cup 20.

The cup cover assembly 30 includes an upper cover 31 which is generally made of plastic material and molded by an injection molding.

The inner surface of the upper cover 31 defines an anti-overflow detecting element 50, and the anti-overflow detecting element 50 electrically is connected to the main control board.

The working principle of generating signals is that: the anti-overflow detecting element 50 electrically is connected to the main control board in the main engine 10 through a connecting cable, and the connecting cable and the zero line form a loop. When a part of the foam contacts the anti-overflow detecting element 50, the voltage at the anti-overflow detecting element 50 changes, thereby generating a control signal and transmitting the control signal to the main control board, and then the main control board issues an instruction, and the heating device stops heating accordingly. As long as the foam contacts with the anti-overflow detecting element 50, the food processor 100 does not heat all the time.

According to the technical solution of the present disclosure, the anti-overflow detecting element 50 is defined at the inner surface of the upper cover 31, so that when a part of foam contacts the anti-overflow detecting element 50, the main control board controls the heating device to stop heating, then no foam is generated, for preventing the foam from overflowing the stirring cup 20. When the foam disappear, the anti-overflow detecting element 50 feeds the signal back to the main control board, the main control board controls the heating device to heat again, thus repeatedly working until the food is heated to be braised.

Because the heated food is generally sticky, the foam is prone to stick to the side wall of the stirring cup 20, and if the anti-overflow detecting device is arranged at the side wall of the stirring cup 20, which may cause the generated anti-overflow signal to be inaccurate, thus further causing the main control board to control the heating device to stop heating for a long time. However, the anti-overflow detecting element 50 is defined at the inner surface of the upper cover 31, which can improve the accuracy of signal generated by the anti-overflow detecting element 50. And, as the anti-overflow detecting element 50 is arranged at the inner surface of the upper cover 31, it does not need to modify the structure of the stirring cup 20 of the existing food processor 100, which is convenient to the design and process.

Referring to FIG. 2, the heating device includes a heat conducting plate 21 and a heating assembly 22, the heat conducting plate 21 is generally a stainless steel plate. The heat conducting plate 21 is arranged at the bottom of the stirring cup 20, the heating assembly 22 is arranged below the heat conducting plate 21, and the heating assembly 22 electrically is connected to the main control board 12. The main control board 12 controls the heating assembly 22 to heat the heat conducting plate 21, the heat conducting plate 21 transfers the heat into the stirring cup 20. Generally, the heat conducting plate 21 is disposed at the bottom of the stirring cup 20.

The heating assembly 22 and the heat conducting plate 21 can be integrated together or separately arranged, and the arrangement mode of the heating assembly 22 and the heat conducting plate 21 can be set according to specific conditions. Even, the heating assembly 22 can directly heat the liquid in the stirring cup 20 without the heat conducting plate 21. For example, the liquid in the stirring cup 20 is heated by a film heating mode.

The heating assembly 22 is a resistance heating assembly, the resistance heating assembly is arranged at a lower surface of the heat conducting plate 21, and which is regarded as a resistance heating mode.

Alternatively, the heat conducting plate 21 is a magnetic conducting plate, and the magnetic conducting plate 21 is generally a magnetic conducting stainless steel plate, and can be integrally manufactured by a magnetic conducting metal material, such as 430 stainless steel or cast iron. Of course, the magnetic conducting plate 21 can also include a plate body manufactured by a non-magnetic conducting material such as ceramic, and a magnetic conducting film attached to the bottom surface of the plate body. The heating assembly 22 is an electromagnetic heating assembly (i.e., an electromagnetic coil), and the electromagnetic heating assembly faces the magnetic conducting plate 21. This is the electromagnetic heating mode. When the electromagnetic heating mode is adopted, the heat conducting plate 21 at the lower end of the stirring cup 20 is heated. As the electromagnetic heating assembly has a long service life, and a low maintenance and replacement cost. And, the electromagnetic heating assembly utilizes high-frequency electromagnetic action to generate heat, the heat is fully utilized, and basically no loss occurs, so that the heat is concentrated at the heat conducting plate 21. The internal molecules of the heat-conducting plate 21 directly induce magnetic energy to generate heat, such that the heat-conducting plate 21 can start to heat immediately, the average preheating time is shortened by more than 60 percent compared with the resistance coil heating mode, and the thermal efficiency is as high as more than 90 percent. Under the same conditions, the electromagnetic heating mode saves 30 percent to 70 percent of electricity compared with the resistance coil heating mode, thus greatly improving the use efficiency.

Referring to FIG. 1, the upper cover 31 defines a feed inlet, and a feed cover 32 is mounted at the feed inlet. A sealing retaining ring (not shown) is provided between a portion of the upper cover 31 extending into the stirring cup 20 and a wall of the stirring cup 20 to seal the cup rabbet of the stirring cup 20.

Generally, the distance between the sealing retaining ring and the wall of the stirring cup is very small, the sealing retaining ring can even attach to the wall to prevent liquid foam from leaking out of the water outlet 20a of the cup rabbet of the stirring cup 20. Since the water outlet 20a of the cup rabbet of the stirring cup 20 is sealed, the foam may generally overflow from the feed inlet, as the anti-overflow detecting element 50 forms an anti-overflow detecting device that generates the signal when detects the foam, thus preventing the foam from overflowing from the feed inlet.

Referring to FIGS. 1 to 4, in an embodiment of the present disclosure, the anti-overflow detecting element 50 is an anti-overflow metal inner cover 501, the anti-overflow metal inner cover 501 at least includes a metal ring 50b extending towards the inside of the stirring cup 20.

The anti-overflow detecting element 50 is made into an anti-overflow metal inner cover 501, so that the detecting area of the anti-overflow detecting element 50 is increased. The anti-overflow metal inner cover 501 attaches to the inner surface of the upper cover 31, and the upper cover 31 is made of a material with good thermal insulation performance such as plastic, rubber, glass, or the like, so as to prevent the heat transferred by the anti-overflow detecting element 50 from scalding user. The metal ring 50b serves to sense foam in advance. Generally, referring to FIG. 4, the metal ring 50b extends downwards at a distance H in a range of 0.5 millimeters to 70 millimeters. By adopting the distance range, the metal ring 50b would enable the structure of the anti-overflow metal inner cover 501 to interfere with the normal operation of the food processor 100 on the premise of sensing foam in advance to carry out an anti-overflow prejudgment.

Figure 6:
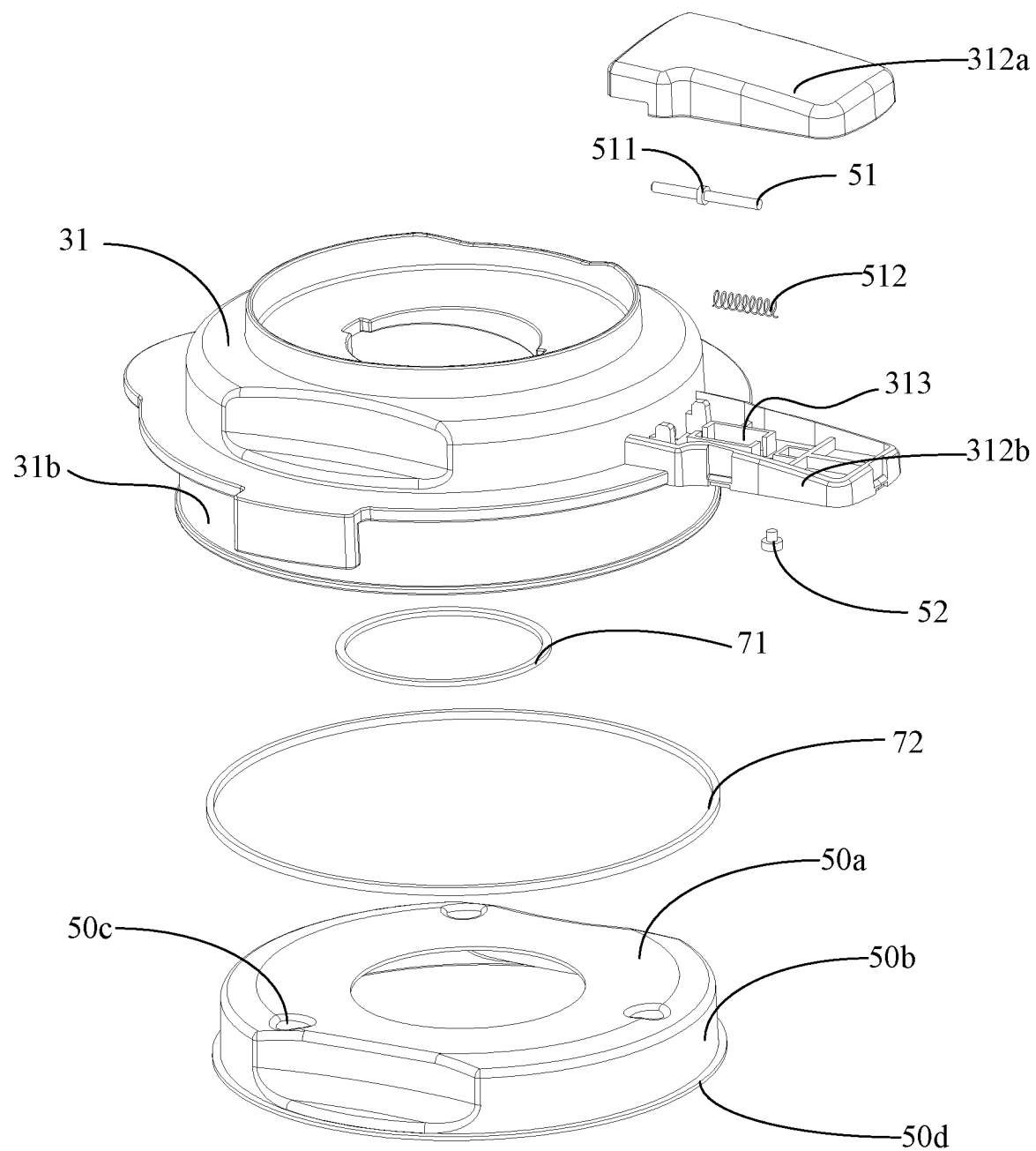
FIG. 6 is a partial structural diagram of the food processor of FIG. 1 having the anti-overflow metal inner cover according to an embodiment.
Figure 7:
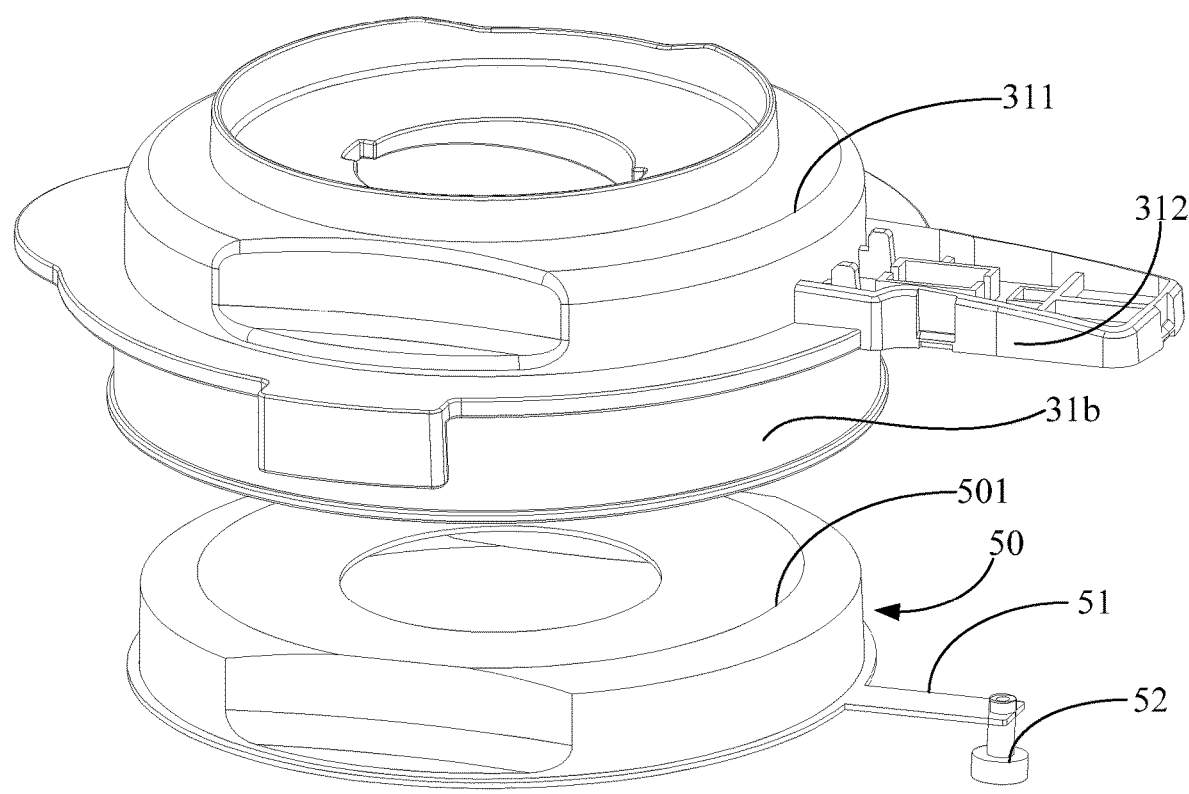
FIG. 7 is a partial structural diagram of the food processor of FIG. 1 having the anti-overflow metal inner cover according to another embodiment.

Referring to FIGS. 6 and 7, the anti-overflow metal inner cover 501 includes an annular cover plate 50a, the metal ring 50b extends from an outer periphery of the cover plate 50a to the inside of the stirring cup 20, and the anti-overflow metal inner cover 501 is positioned in the upper cover 31. In other words, the center of the annular cover plate 50a defines an avoiding hole matched with the feed inlet, so that the feeding operation can be conveniently carried out.

Generally, the anti-overflow metal inner cover 501 can be connected to the upper cover 31 through two modes.

Mode 1: the cover plate 50a defines a plurality of screw holes 50c, the upper cover 31 is correspondingly provided with screw posts 31c, the food processor 100 further includes screw bolts (not shown), and the cover plate 50a is fixedly connected to the upper cover 31 by screw bolts passing through the screw holes 50c and the screw posts 31c. That is, the anti-overflow metal inner cover 501 is fixedly connected to the upper cover 31 by screw bolts.

Figure 5:
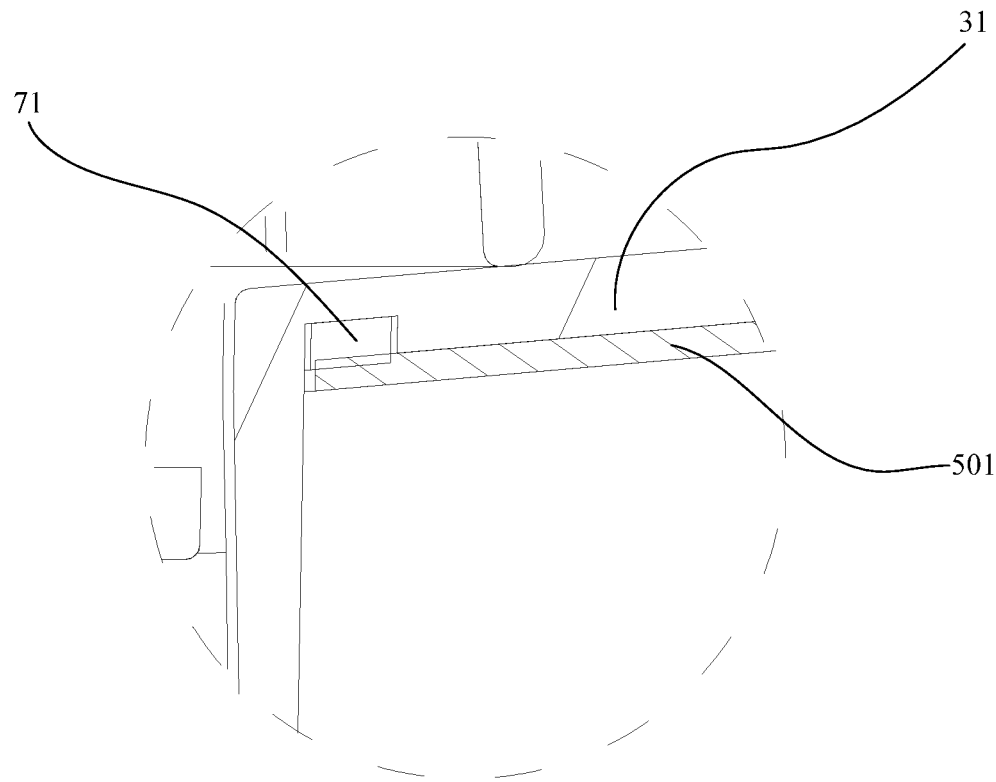
FIG. 5 is an enlarged diagram of portion C shown in FIG. 2.

Referring to FIGS. 5 and 6, in order to enhance the seal performance between the anti-overflow metal inner cover 501 and the upper cover 31, the upper side of the cover plate 50a defines a first sealing ring 71, the first sealing ring 71 is adjacent to the inner periphery of the cover plate 50a, and the lower side of the metal ring 50b defines a flanging 50d, and a second sealing ring 72 is provided between the flanging 50d and the upper cover 31.

Mode 2: the anti-overflow metal inner cover 501 and the upper cover 31 are integrally formed. The anti-overflow metal inner cover 501 and the upper cover 31 are manufactured by an integral molding manner, for simplifying the steps of processing and assembling. In general, since the upper cover 31 is a plastic element and the anti-overflow metal inner cover 501 is a metal element, the upper cover 31 and the anti-overflow metal inner cover 501 are molded by a secondary injection molding.

Figure 8:
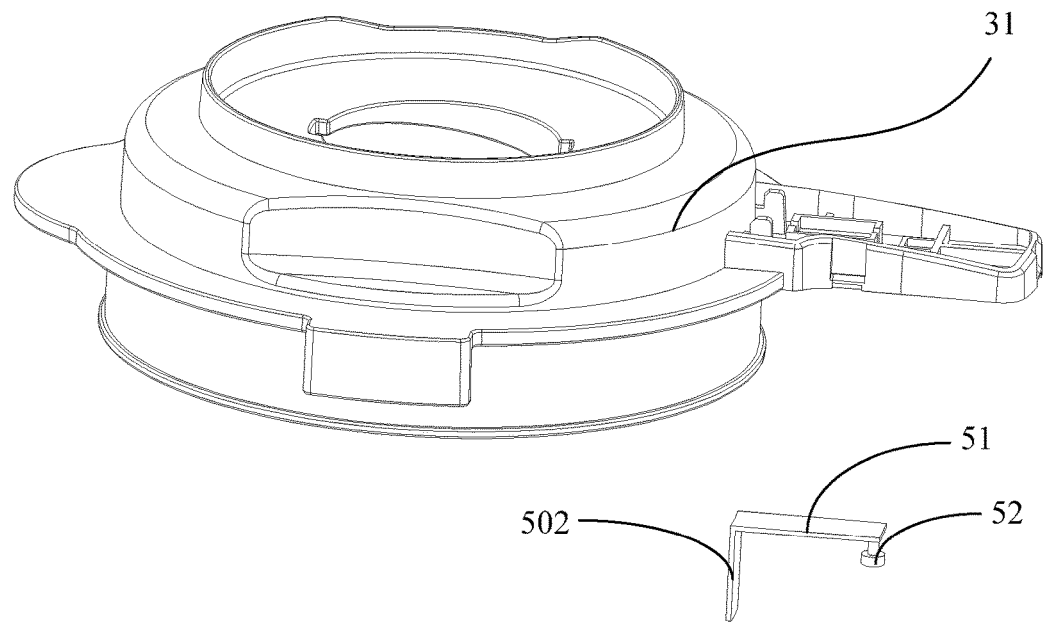
FIG. 8 is a partial structural diagram of the food processor of FIG. 1 having the anti-overflow metal detecting strip according to an embodiment.
Figure 9:
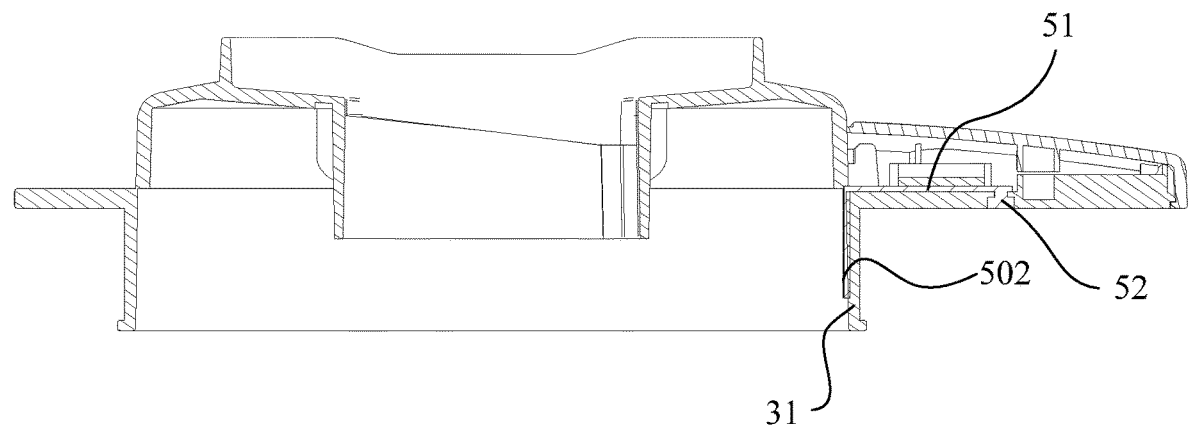
FIG. 9 is a partial cross-sectional diagram of the food processor of FIG. 1 having the anti-overflow metal detecting strip according to an embodiment.

Referring to FIGS. 8 and 9, in a second embodiment of the present disclosure, the anti-overflow detecting element 50 is an anti-overflow metal detecting piece 502, the anti-overflow metal detecting piece 502 attaches to the inner surface of the upper cover 31 and extends towards the inside of the stirring cup 20. That is, a small piece of metal sheet is arranged at the inner surface of the upper cover 31 for detecting overflow.

As shown in FIG. 9, the anti-overflow metal detecting piece 502 and the upper cover 31 are in the integrated structure. In general, since the upper cover 31 is a plastic element and the anti-overflow metal detecting piece 502 is a metal element, the upper cover 31 and the anti-overflow metal detecting piece 502 are molded by the secondary injection molding method.

The signal transmitting structure in the present disclosure will be described as below.

Referring to FIGS. 2 to 5, the upper cover 31 includes a main body 311 that covers the cup rabbet of the stirring cup 20, and a mounting part 312 that is radially protruded from a side of the main body 311. The mounting part 312 is internally provided with an electric conductor 51, one end of the electric conductor 51 is connected to the anti-overflow detecting element 50, and the other end of the electric conductor 51 electrically is connected to the main control board.

In this way, when the upper cover 31 covers the cup rabbet, the mounting part 312 and the handle 23 are clamped with each other. It can be understood that the upper cover 31 can be mounted through rotating or directly clamping. Generally, the mounting part 312 includes a lower cover 312b connected to the main body 311, and an upper cover 312a fastened to the lower cover 312b, and the electrical conductor 51 is accommodated in a cavity formed by the lower cover 312b and the upper cover 312a. The anti-overflow detecting element 50 and the main control board are coupled together through the electric conductor 51, and the signal detected by the anti-overflow detecting element 50 can be transmitted to the main control board.

In the present disclosure, in general, there are two modes of connecting the electric conductor 51 to the main control board:

The first mode is mechanical connection. Referring to FIGS. 2 to 7, the end of the electric conductor 51 away from the anti-overflow detecting element 50 defines a conducting rod 52. The stirring cup 20 defines the handle 23, the upper end of the handle 23 defines an avoiding hole, a conducting needle 60 is defined in the avoiding hole, one end of the conducting needle 60 electrically is connected to the main control board, and the other end of the conducting needle 60 exposes from the avoiding hole to contact with the conducting rod 52.

In this way, when the foam contacts with the anti-overflow detecting element 50, the signal is transmitted to the electric conductor 51 via the anti-overflow detecting element 50, and then to the main control board via the electric conductor 51, the conducting rod 52, and the conducting needle 60. Specifically, the conducting rod 52 passes through the lower cover 312b, as such the conducting rod 52 can be connected to the conducting needle 60 more stably. The handle 23 is internally provided with a connecting wire, the conducting needle 60 can be coupled with an upper coupler (not shown) at the lower end of the stirring cup 20 through the connecting wire. A lower coupler (not shown) electrically connected to the main control board is arranged at a housing of the main engine 10, and the upper coupler and the lower coupler are coupled together to enable the signal to be transmitted.

Figure 3:
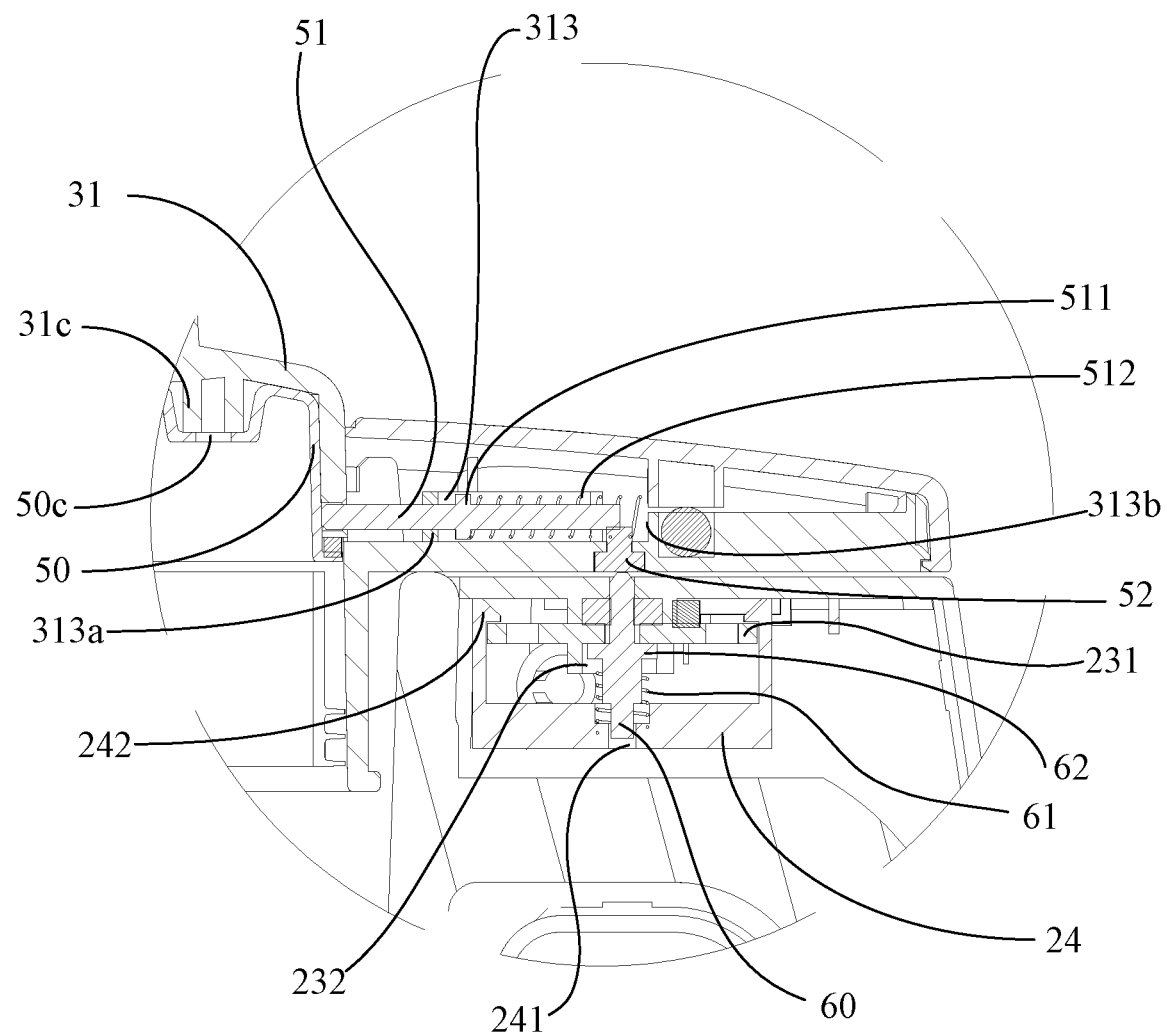
FIG. 3 is an enlarged diagram of portion A shown in FIG. 2.

Referring to FIGS. 2, 3 and 6, the electrical conductor 50 is installed as follows:

The mounting part 312 defines a sliding groove 313, the electric conductor 51 is mounted in the sliding groove 313, and one end of the electric conductor 51 passes through the sliding groove 313 to abut against the anti-overflow detecting element 50.

The sliding groove 313 is also internally provided with a first spring 512. The first spring 512 sleeves around the end of the electric conductor 51 away from the anti-overflow detecting element 50. When the first spring 512 is in a compressed state, the electric conductor 51 abuts against the anti-overflow detecting element 50.

That is, the electric conductor 51 and the anti-overflow detecting element 50 are separately arranged. When the anti-overflow detecting element 50 is installed on the upper cover 31, the anti-overflow detecting element 50 presses the electric conductor 51, so that the electric conductor 51 slides in the sliding groove 313, and the first spring 512 is in the compressed state, the anti-overflow detecting element 50 tightly abuts against the electric conductor 51, so that the connection between the electric conductor 51 and the anti-overflow detecting element 50 is stable, and signal transmission is facilitated.

Figure 4:
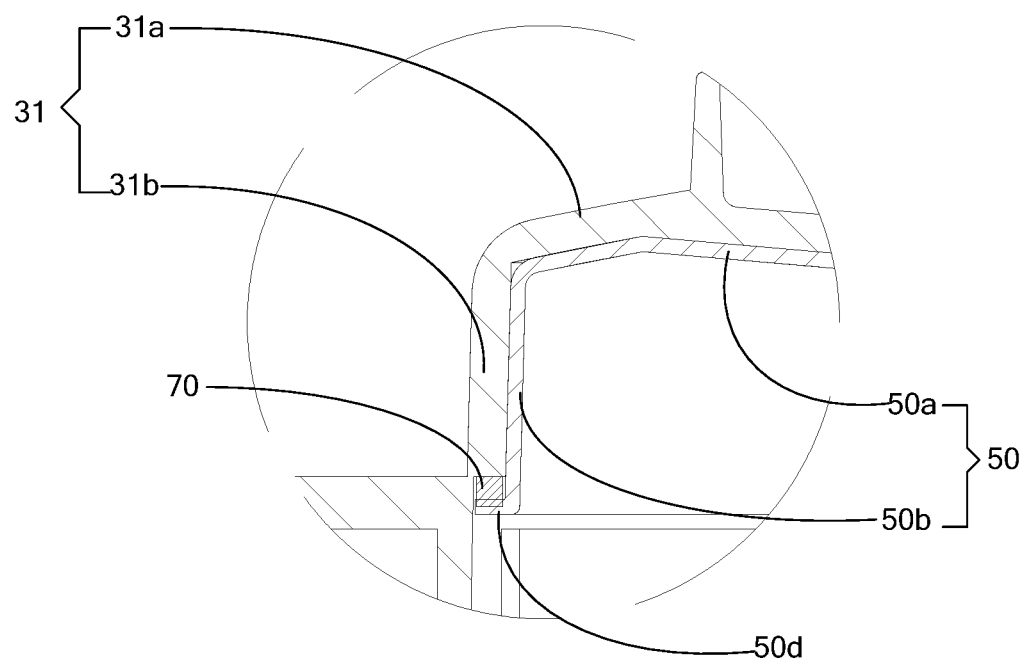
FIG. 4 is an enlarged diagram of portion B shown in FIG. 2.

In the embodiment, referring to FIG. 4, the conducting rod 52 and the electric conductor 51 are defined to be integrally set.

Of course, the anti-overflow detecting element 50, the electric conductor 51, and the conducting rod 52 can be defined to be integrally formed. According to the arrangement, the integral punch molding or integral injection molding is adopted during processing.

Referring to FIGS. 2 and 3, the handle 23 is internally provided with a support 231, and the support 231 defines a sliding hole 232, the conducting needle 60 slides in the sliding hole 232, and the sliding hole 232 includes a small aperture section communicated with the avoiding hole and a large aperture section communicated with the small aperture section;

The end of the conducting needle 60 away from the conducting rod 52 is also sleeved with a second spring 61, the conducting needle 60 defines an abutting part 62 which elastically abuts against the second spring 61, and the abutting part 62 abuts against the joint of the hole wall of the large aperture section and the hole wall of the small aperture section.

In this way, through the arrangement of the second spring 61, the connection between the conducting rod 52 and the conducting needle 60 is much more tight. When the second spring 61 is in the compressed state, the conducting rod 52 abuts against and couples with the conducting needle 60. When the upper cover 31 is not mounted on the stirring cup 20, or when the upper cover 31 is mounted on the stirring cup 20, while the mounting part 312 does not correspond to the handle 23, the conducting rod 52 does not abut against and couple with the conducting needle 60.

Furthermore, the handle 23 is internally provided with an mounting box 24 with an opening, the bottom wall of the mounting box 24 facing the opening defines a mounting hole 241, and the mounting box 24 defines buckles 242 on both sides of the opening.

The support 231 is mounted in the mounting box 24 and is clamped with the buckles 242. One end of the second spring 61 is accommodated in the mounting hole 241, and the other end of the second spring 61 elastically abuts against the abutting part 62.

In this way, through the arrangement of the mounting box 24, the mounting bracket can be mounted much more stably. Generally, the connection wire passes through the mounting hole 241 of the mounting box 24 to communicate with the conducting needle 60.

Figure 10:
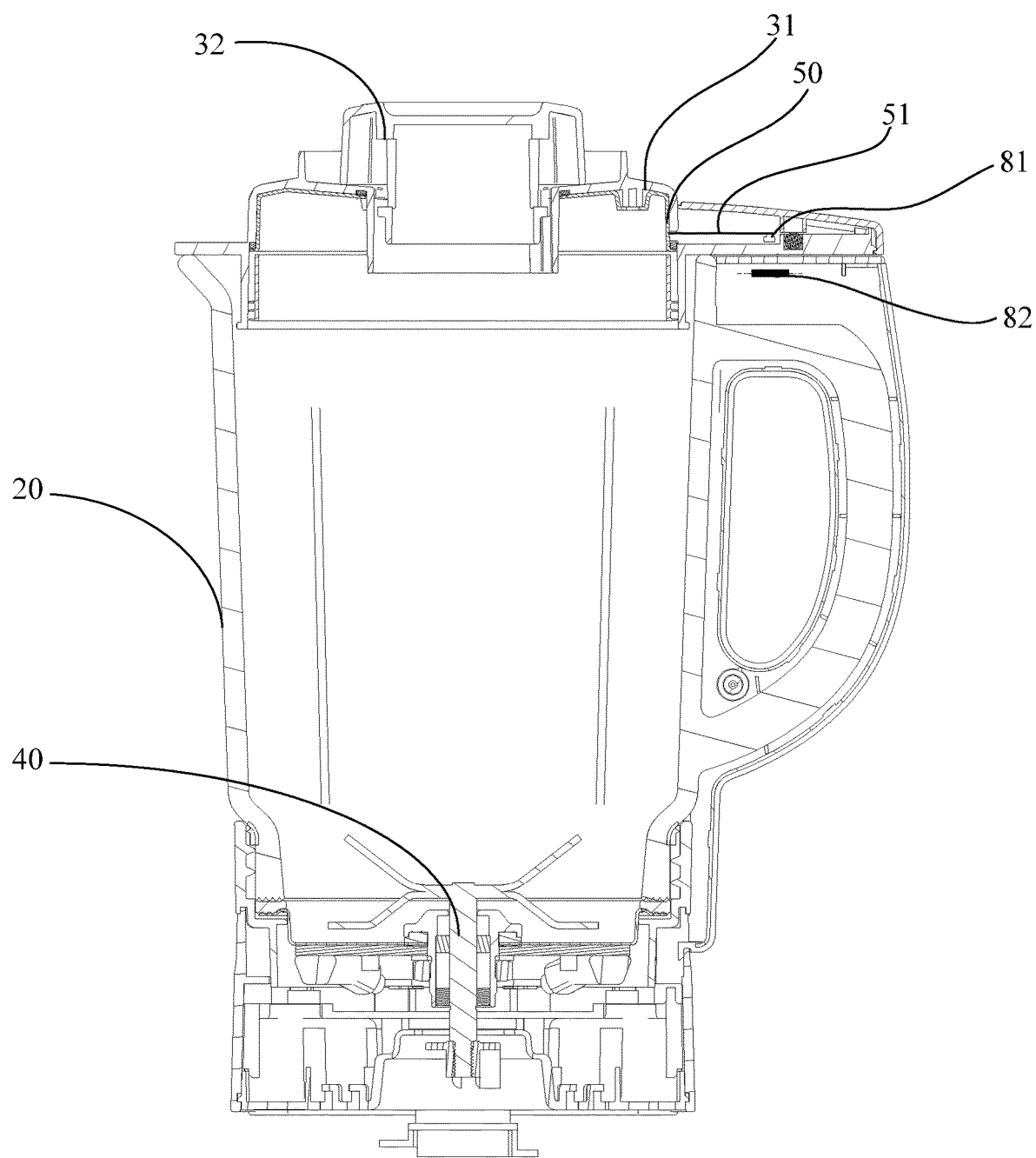
FIG. 10 is a partial cross-sectional diagram of the food processor of FIG. 1 transmitting signals through electromagnetism according to an embodiment.

The second mode is magnetic induction connection. Referring to FIG. 10, the end of the electric conductor 51 away from the anti-overflow detecting element 50 defines a first induction element 81.

The upper end of the handle 23 defines a second induction element 82, the second induction element 82 is coupled with the first induction element 81, and the second induction element 82 electrically is connected to the main control board. The first induction element 81 and the second induction element 82 are generally electromagnetic coupling coils.

The anti-overflow detecting element 50 detects an induction signal and transmits the induction signal to the first induction element 81 through the electric conductor 51. As the first induction element 81 and the second induction element 82 are coupled together, the induction signal is transmitted to the second induction element 82, and then to the main control board through the second induction element 82. The main control board receives the induction signal to complete the overflow judgment and control the overflow.

The anti-overflow detecting element 50, the electric conductor 51, and the first induction element 81 are in the integrated structure. That is, the anti-overflow detecting element, the electric conductor, and the first induction element 81 are integrally formed. Of course, it is also possible to arrange the three separately, which is also within the protection scope of the present disclosure.

In the embodiment, the stirring cup 20 is made of glass, stainless steel, or plastic. The adopting of glass can enable user to clearly observe the operation state of the food processor 100, and, the glass is also convenient to clean. Of course, the stirring cup 20 made of the stainless steel can have a higher the structural strength, so that the stirring cup 20 is not easy to be damaged. The stirring cup 20 made of plastic is more convenient in processing and molding. Of course, the above three are only embodiments of the present disclosure, and the stirring cup 20 may be made of other materials which are also within the scope of protection of the present disclosure.

The foregoing description merely depicts some preferred embodiments of the present disclosure and therefore is not intended to limit the scope of the application. An equivalent structural or flow changes made by using the content of the specification and drawings of the present disclosure, or any direct or indirect applications of the disclosure on any other related fields shall all fall in the scope of the application.

What is claimed is:

1. A food processor, comprising a main engine, a heating device, a stirring cup, a cup cover assembly, and a main control board defined in the main engine, wherein:
the stirring cup is mounted on the main engine, and the cup cover assembly covers the stirring cup;
the heating device is configured to heat the stirring cup and electrically is connected to the main control board; and
the cup cover assembly comprises an upper cover, an inner surface of the upper cover defines an anti-overflow detecting element, and the anti-overflow detecting element is electrically connected to the main control board and is an anti-overflow metal inner cover comprising a metal ring extending towards the inside of the stirring cup.

2. The food processor according to claim 1, wherein the heating device comprises a heat conducting plate and a heating assembly, the heat conducting plate is defined at a bottom of the stirring cup, the heating assembly is defined below the heat conducting plate, and the heating assembly electrically is connected to the main control board; and
the heating assembly is a resistance heating assembly, and the resistance heating assembly is defined at a lower surface of the heat conducting plate;
or, the heating assembly is an electromagnetic heating assembly, the heat conducting plate is a magnetic conducting plate, and the electromagnetic heating assembly faces the magnetic conducting plate.

3. The food processor according to claim 1, wherein the upper cover defines a feed inlet, and a feed cover is mounted at the feed inlet; and
a sealing retaining ring is defined between a portion of the upper cover extending into the stirring cup and a wall of the stirring cup to seal a cup rabbet of the stirring cup.

4. The food processor of claim 1, wherein the metal ring extends downwards at a distance H in a range of 0.5 millimeters to 70 millimeters.

5. The food processor of claim 1, wherein the anti-overflow metal inner cover comprises an annular cover plate, the metal ring extends from an outer periphery of the annular cover plate to an inside of the stirring cup, and the anti-overflow metal inner cover is positioned in the upper cover.

6. The food processor of claim 5, wherein the annular cover plate defines a plurality of screw holes, the upper cover correspondingly defines screw posts, and the annular cover plate is fixedly connected to the upper cover by screw bolts passing through the screw holes and the screw posts.

7. The food processor of claim 6, wherein an upper side of the annular cover plate defines a first sealing ring, the first sealing ring is adjacent to an inner periphery of the annular cover plate, a lower side of the metal ring defines a flanging, and a second sealing ring is defined between the flanging and the upper cover.

8. The food processor according to claim 5, wherein the upper cover is a plastic element, the anti-overflow metal inner cover and the upper cover are in an integrated structure, and the upper cover and the anti-overflow metal inner cover are connected by a secondary injection molding.

9. A food processor, comprising a main engine, a heating device, a stirring cup, a cup cover assembly, and a main control board defined in the main engine, wherein:
the stirring cup is mounted on the main engine, and the cup cover assembly covers the stirring cup;
the heating device is configured to heat the stirring cup and electrically is connected to the main control board; and
the cup cover assembly comprises an upper cover, an inner surface of the upper cover defines an anti-overflow detecting element, and the anti-overflow detecting element is electrically connected to the main control board, wherein the anti-overflow detecting element is an anti-overflow metal detecting piece, and the anti-overflow metal detecting piece attaches to the inner surface of the upper cover, and extends towards the inside of the stirring cup.

10. A food processor, comprising a main engine, a heating device, a stirring cup, a cup cover assembly, and a main control board defined in the main engine, wherein:
the stirring cup is mounted on the main engine, and the cup cover assembly covers the stirring cup;
the heating device is configured to heat the stirring cup and electrically is connected to the main control board; and
the cup cover assembly comprises an upper cover, an inner surface of the upper cover defines an anti-overflow detecting element, and the anti-overflow detecting element is electrically connected to the main control board, wherein the heating device comprises a heat conducting plate and a heating assembly, the heat conducting plate is defined at a bottom of the stirring cup, the heating assembly is defined below the heat conducting plate, and the heating assembly electrically is connected to the main control board; and
the heating assembly is a resistance heating assembly, and the resistance heating assembly is defined at a lower surface of the heat conducting plate;
or, the heating assembly is an electromagnetic heating assembly, the heat conducting plate is a magnetic conducting plate, and the electromagnetic heating assembly faces the magnetic conducting plate, wherein the anti-overflow detecting element is an anti-overflow metal detecting piece, and the anti-overflow metal detecting piece attaches to the inner surface of the upper cover, and extends towards the inside of the stirring cup.

11. The food processor according to claim 9, wherein the upper cover is a plastic element, the anti-overflow metal detecting piece and the upper cover are in an integrated structure, and the upper cover and the anti-overflow metal detecting piece are connected by a secondary injection molding.

12. The food processor according to claim 1, wherein the upper cover comprises a main body covering a cup rabbet of the stirring cup, and a mounting part radially protruding from a side of the main body, an electric conductor is defined in the mounting part, one end of the electric conductor is connected to the anti-overflow detecting element, and the other end of the electric conductor electrically is connected to the main control board.

13. The food processor of claim 12, wherein the end of the electric conductor away from the anti-overflow detecting element defines a conducting rod; and
the stirring cup defines a handle, an upper end of the handle defines an avoiding hole, a conducting needle is defined in the avoiding hole, one end of the conducting needle electrically is connected to the main control board, the other end of the conducting needle exposes from the avoiding hole and abuts against the conducting rod.

14. The food processor according to claim 12, wherein the mounting part defines a sliding groove, the electric conductor is installed in the sliding groove, an end of the electric conductor passes through the sliding groove to abut against the anti-overflow detecting element, and a first spring is defined in the sliding groove, first spring sleeves around the end of the electric conductor away from the anti-overflow detecting element, and the electric conductor abuts against the anti-overflow detecting element when the first spring is in a compressed state.

15. The food processor according to claim 13, wherein the anti-overflow detecting element, the electric conductor, and the conducting rod are in an integrated structure.

16. The food processor according to claim 13, wherein the end of the electric conductor away from the anti-overflow detecting element defines a first induction element; and
the upper end of the handle defines a second induction element, the second induction element is coupled with the first induction element, and the second induction element electrically is connected to the main control board.

17. The food processor according to claim 16, wherein the anti-overflow detecting element, the electrical conductor, and the first induction element are in an integrated structure.

18. The food processor according to claim 1, wherein the stirring cup is made of glass, stainless steel, or plastic.

* * * * *